Patented Feb. 27, 1951

2,543,229

UNITED STATES PATENT OFFICE 2,543,229

POLYTHENE LAYER BONDED TO ANOTHER LAYER BY ETHYLENE-VINYL ACETATE INTERPOLYMER ADHESIVE

Aurelius F. Chapman, Kenmore, N. Y., assignor to E. I. du Pont de Nemours & Company, Wilmington, Del., a corporation of Delaware No Drawing. Application April 27, 1948,
Serial No. 23,621

11 Claims. (Cl. 154—139)

This invention relates to a polythene adhesive and to a new composition of matter comprising at least three adherent parts, one of which is a normally solid polymer of ethylene, another a support therefor, and the third an ethylene/vinyl acetate interpolymer which firmly unites the normally solid polymer of ethylene to the support.

The normally solid polymers of ethylene, herein called polythene and prepared in accord with the Fawcett et al. Patent 2,153,533, wherein ethylene is polymerized at pressures between 500 and 1000 atmospheres and at temperatures between 100 and 400° C. or processes that give equivalent products, are used for a large number of purposes. For example, they may be used as a substitute for Cel-O-Glass as closures and interlinings, in the coating of fabrics, in the preparation of electrical cables and battery insulators, and for many other uses in which they are coated on flexible or solid supports or are integral therewith. In many of these and allied uses, it is necessary for optimum utility to fix the base or supporting material to the polythene and/or the polythene to itself. A number of them are commercially acceptable, their failure residing principally in inability to adhere with satisfactory tenacity under normal temperature and humidity conditions either to the polythene or to the support.

There are a number of attributes that are mandatory for a polythene adhesive. When the polythene is laminated to paper, for example, it is desirable that the coated paper surface be relatively hard, smooth, water-repellent, preferably transparent, colorless, and that it maintain its transparency and colorlessness over a long period of time. It is also desirable that the polyethene be applied to the paper or to other similar surfaces with facility. The adhesion between the polythene and support should be so well established after the application of moderate pressure that any attempt to separate the layers will result in destruction or partial destruction of one or the other.

An object of the present invention is to provide an adhesive for polythene. Another object is to provide a composition of matter containing polythene firmly united to a support by means of an ethylene/vinyl acetate interpolymer. A further object of the invention is to provide an adhesive for polythene, which adhesive is an ethylene/vinyl acetate interpolymer containing from 2 to 3 moles of ethylene per mole of vinyl acetate. Yet, another object is to provide polythene laminations. Other objects of the invention will hereinafter appear.

These objects are accomplished in accordance with the invention by providing as new compositions of matter a support coated with an ethylene/vinyl acetate interpolymer having a mole ratio of ethylene to vinyl acetate not substantially less than 1.5:1 and not substantially more than 3.5:1, to which coated support the interpolymer firmly fixes a normally solid polymer of ethylene. The interpolymer of ethylene and vinyl acetate may be applied to the support from solution, as a film or in any suitable manner. A flexible support may be used, such, for example, as a textile fabric or yarn, cellophane, a cellulose derivative, glassine paper, synthetic or natural rubber, metal foil, synthetic resin foil, or for that matter polythene itself. In lieu of a flexible support, a more or less inflexible support may be used such, for example, as wood, metal (ferrous or non-ferrous), stone, plaster of Paris, resinous bodies such as phenol formaldehyde resins, urea formaldehyde resins, and the plastic materials such as polyvinyl acetate, polyvinyl choride, polymethacrylic acid, and its polymeric esters, polystyrene, butadiene polymers, and the like.

In a more specific embodiment, the invention contemplates the preparation of laminated sheets and the laminations thus prepared. For example, these laminations may consist of a flexible backing having one side thereof coated with polythene, and the other side a more or less flexible and transparent synthetic plastic such as those described above, these layers being held together with the interpolymer adhesive layer. A further embodiment includes the use of wood with alternate laminations of polythene firmly attached to the wood by means of interpolymer adhesive layers. The invention contemplates likewise a plurality of layers of these materials which may, if the support has a grain, be layered with the grain in alternate layers in staggered directions.

The ethylene/vinyl acetate interpolymers which may be used in this invention are described in the Perrin et al. Patent 2,200,429 of May 14, 1940, although any identical interpolymer may be used. The interpolymers having mole ratios of ethylene to vinyl acetate as high as 3.5:1 and as low as 1.5:1 are useful in the invention, the interpolymers having from 2:1 to 3:1 being preferred. Ethylene/vinyl acetate interpolymers having ratios below 1.5:1 are less resilient and flexible, particularly at low temperatures and are, therefore, not acceptable as adhesives for this purpose, while interpolymers having ratios higher than 3.5:1 are less adhesive at normal temperatures and, accordingly, are not for uses involving pressure sensitive adhesive techniques.

If desired, other film forming and adhesive materials may be blended with the ethylene/vinyl acetate interpolymers to form the adhesive base. Such blends not only form the basis of good adhesives, but in certain instances, may also be cheaper than ethylene/vinyl acetate alone. Examples of such modifiers are rubber, synthetic rubber, polyisobutylene (especially the low molecular weight grades), polyvinyl acetate, polyvinyl butyral, cellulose nitrate, cellulose acetate, ethyl cellulose, vinyl chloride-vinyl acetate interpolymers, and polyvinyl chloride. These blends, however, should not contain such a large percentage of the modifiers that the excellent adhesive properties of the ethylene/vinyl acetate adhesive are detrimentally lowered.

The following examples illustrate some embodiments of the invention in which parts are by weight unless otherwise indicated.

*Example 1.*—A 20% solution in toluene of an ethylene/vinyl acetate interpolymer having a mole ration of ethylene to vinyl acetate of 2.7:1 was applied in a thin layer to kraft paper with a doctor knife and dried for 30 minutes at 100° C. to remove the solvent. Polythene film was then applied to the adhesive-coated paper and the lamination placed in a Carver press for 15 minutes at 90° C. under slight pressure. The lamination was stored at room temperature for 16 hours, cut into strips 1½" wide and the peeling bond strength at 35% R. H./75° F. determined on a Suter tester. A bond strength of 1200 grams at 75° C. and at 0° C. between the kraft paper and the polythene was observed.

*Example 2.*—A sheet of polythene was sealed to another sheet of polythent after coating one of the sheets with a 20% solution of ethylene/vinyl acetate (2.7:1) in methyl ethyl ketone, and after the solvent had evaporated the bond was made by pressing the sheets together with a pressure of about 10 p. s. i. This solution does not swell the polythene and does not cause the film to curl when the adhesive is applied. Bond strengths of 100 grams were obtained at sealing temperatures ranging from 75 to 90° C. Seals made immediately after applying the adhesive, without permitting the solvent to evaporate first, showed bond strengths of about 700 grams.

*Example 3.*—A 20% toluene solution of ethylene/vinyl acetate (2.7:1 mole ratio) was applied to a polythene support and allowed to dry. The amount applied was regulated to give a coating having approximately 0.005 inch thickness of the interpolymer when dry. The coating was non-tacky and when pressed, at a temperature between 70 and 90° C. to glass, metals, polymethacrylic acid, methyl ester and Vinylite, was very adherent. The coating showed no tendency to oxidize, degrade, or embrittle on storage. The coated polythene could not be pulled off the solids without tearing.

*Example 4.*—A strip of cellophane was coated with a 20% solution, in methyl ethyl ketone, of an ethylene/vinyl acetate copolymer having a mole ratio of 2.7:1 and allowed to dry thoroughly. The coated strip was transparent, colorless, non-tacky on the coated side, and flexible. By the application of pressure of about 10 p. s. i. at a temperature between 70 and 90° C., a film of a polythene was fixed to these surfaces and could not be removed therefrom without tearing.

It will be understood that the examples given herein are illustrative rather than limitative and that numerous modifications of the invention can be made without departing from it. For instance, the ethylene/vinyl acetate interpolymer may be hydrolyzed to a minor extent prior to use, if desired, and also minor amounts of polymer components other than ethylene and vinyl acetate may be present in the interpolymer.

The adhesive layer of the invention may be applied in any convenient manner, for example, by dissolving the interpolymer in a solvent or mixture of solvents, and then coating the support or polythene or both with the solution; by milling together, the interpolymer and the aforesaid modifiers on cold or heated rolls such as are used for milling rubber, and then pressing a film of the milled interpolymer to the support or polythene by pressures of 5 to 1000 p. s. i.; by dispersing the interpolymer in an aqueous phase to the support or to the polythene, or by passing a film of the polythene and a film of the interpolymer over a calendering roll either with or without a modifying agent. Alternatively, the interpolymer may be coated on the polythene or on the support as a hot melt, and while still hot, the support and polythene calendered, rolled or pressed together.

I claim:

1. A flexible laminated product comprising a layer of polythene and a flexible support, the polythene being firmly united to the flexible support by an ethylene/vinyl acetate interpolymer having from 1.5 to 3.5 moles of ethylene per mole of vinyl acetate.

2. A flexible laminated product comprising a layer of polythene and a flexible support therefor, the polythene being firmly united to the flexible support by an ethylene/vinyl acetate interpolymer having from 2 to 3 moles of ethylene per mole of vinyl acetate.

3. A flexible laminated product comprising a film of polythene and a flexible support, the film being firmly united to the flexible support by an ethylene/vinyl acetate interpolymer having from 2 to 3 moles of ethylene per mole of vinyl acetate.

4. A lamination of claim 3 in which the support is polythene.

5. The lamination of claim 3 in which the support is paper.

6. A lamination product having a plurality of alternate layers of polythene film and a flexible support, the polythene film layers being firmly united to the flexible support layers by an ethylene/vinyl acetate interpolymer having from 2 to 3 moles of ethylene per mole of vinyl acetate.

7. The lamination of claim 6 in which the support is polythene.

8. The lamination of claim 6 in which the support is paper.

9. A flexible laminated product comprising a layer of polythene and a flexible support, the polythene being firmly united to the flexible support by an ethylene/vinyl acetate interpolymer having 2.7 moles of ethylene per mole of vinyl acetate.

10. The lamination of claim 9 in which the support is polythene.

11. The lamination of claim 9 in which the support is paper.

AURELIUS F. CHAPMAN.

REFERENCES CITED

The following references are of record in the file of this patent:

UNITED STATES PATENTS

| Number | Name | Date |
|---|---|---|
| 2,065,941 | Lane | Dec. 29, 1936 |
| 2,200,429 | Perrin | May 14, 1940 |
| 2,238,681 | Dorough | Apr. 15, 1941 |
| 2,340,452 | Child | Feb. 1, 1944 |
| 2,386,347 | Roland | Oct. 9, 1945 |
| 2,388,169 | McAlvey | Oct. 30, 1945 |
| 2,400,139 | Roland | May 14, 1946 |
| 2,403,465 | Pease | July 9, 1946 |